Aug. 23, 1966 N. J. LA COSTA ETAL 3,268,298
LOW-TO-HIGH PRESSURE ADMISSION VALVE FOR GAS GENERATOR
Original Filed July 28, 1961

NICHOLAS J. LACOSTA
THEODORE G. STASTNY
INVENTORS

BY Thomas J. Holden
Donald M. Sandler

ATTORNEYS

3,268,298
LOW-TO-HIGH PRESSURE ADMISSION VALVE FOR GAS GENERATOR

Nicholas J. La Costa, Phoenix, and Theodore G. Stastny, Towson, Md., assignors to Aircraft Armaments, Inc., Cockeysville, Md., a corporation of Maryland
Continuation of application Ser. No. 127,742, July 28, 1961. This application Mar. 23, 1965, Ser. No. 444,930
6 Claims. (Cl. 23—282)

This application is a continuation of our prior copending application Serial No. 127,742, filed July 28, 1961, and now abandoned.

This invention relates to gas generators that produce gas upon the addition of fluid, and more particularly to gas generators of the type wherein the pressure of the gas generated exceeds the pressure of the source of fluid.

A gas generator of the type described has a reaction chamber adapted to contain a substance that reacts chemically with a fluid to produce a gas. As the reaction proceeds to generate gas at a faster rate than it is used, the pressure in the reaction chamber soon exceeds the pressure of the source from which the fluid is drawn. When this occurs, no additonal fluid from the source can be forced into the reaction chamber. As a result, it is conventional to make the reaction chamber of a volume large enough to hold all of the fluid necessary to react all of the substance in the chamber, and to combine all of the necessary fluid with the substance when it is desired to generate gas.

The ability to continuously add fluid during the gas generation process permits the reaction chamber to be reduced in size until it is only slightly larger in volume than the reactive substance originally contained in the chamber. However, prior to this invention, it was necessary to pressurize the fluid in order that it may force its way into the reaction chamber after the latter reaches its working pressure. This requirement to pressurize the fluid increases the complexity of the generator and overbalances any saving due to a reduction in the generator size.

It is therefore a primary object of this invention to provide a gas generator of the type described wherein fluid from a source at a lower pressure can be added to a reaction chamber at a higher pressure during the generation of gas.

It is a further object of this invention to control the rate at which fluid enters the reaction chamber by utilizing a decrease in the gas pressure to cause the addition of fluid and so increase the rate of gas generation, and an increase in the gas pressure to prevent the addition of fluid and so decrease the rate of gas generation.

In carrying out the objects of the invention a preferred embodiment, which is illustrated in the drawings, includes a gas generator which is provided with a liquid-containable chamber connectable to both the source of fluid in liquid form and the reaction chamber. A differential piston, reciprocally mounted in the liquid-containable chamber, alternatively connects the liquid-containable chamber to either the source or the reaction chamber. A spring biases the piston toward a position at which it serves to connect the reaction chamber to the liquid-containable chamber and to disconnect the latter from the source. Prior to the start of gas generation, the force on the piston due to the pressure in the reaction chamber is less than the oppositely directed force on the piston due to the spring; and fluid in the liquid-containable chamber flows into the reaction chamber. As the pressure in the latter builds up due to the chemical reaction, the force on the piston opposing the spring eventually exceeds that due to the spring thereby moving the piston to a position at which it serves to disconnect the reaction chamber from the liquid-containable chamber and to connect the latter to the source. Fluid then is free to flow into the liquid-containable chamber despite the fact that the source pressure is less than the pressure in the reaction chamber by an amount depending upon the spring constant. When the gas pressure drops below a preselected value (which is greater than the fluid pressure), the spring moves the piston until the liquid-containable chamber is disconnected from the source and connected to the reaction chamber. The liquid fluid in the liquid-containable chamber then flows into the reaction chamber to cause gas generation to continue.

Still other objects, features and attendant advantages will become apparent to those skilled in the art from a reading of the following detailed description of one preferred embodiment constructed in accordance with the invention, taken in conjunction with the accompanying drawings wherein.

Figure 1:
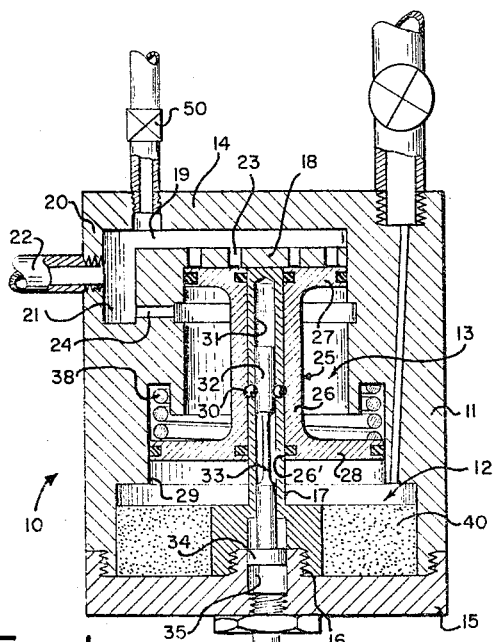
FIGURE 1 is a vertical cross-section of a gas generator of the type described into which the admission valve of this invention is incorporated showing the valve locked in position prior to the start of gas generation.

Referring now in detail to the figures of the drawings, a gas generator made in accordance with the present invention is shown generally at 10. Generator 10 includes upright cylindrical housing 11 with an axially extending bore defining reaction chamber 12 and liquid-containable chamber 13. The top end 14 of housing 11 is closed and the bottom end is externally threaded to receive bottom cover 15. Cover 15 has threaded central boss 16 to receive support rod 17 which extends coaxially of the housing from cover 15, through reaction chamber 12 and liquid-containable chamber 13, into abutting relationship with wall 18 adjacent top 14.

Connecting recess 19, between top 14 and wall 18, extends from a point somewhat beyond the axis of housing 11 to a point adjacent side vertical wall 20, and is connected to annular recess 21. Pipe 22 threaded into wall 20 is connected to a fluid supply (not shown) at a certain pressure level so that recesses 19 and 21 are filled with fluid at all times and form a source of fluid for the generator. Apertures 23 in wall 18 connect recess 19 to liquid-containable chamber 13, and conduit 24 connects annular recess 21 to chamber 13 at a point somewhat below wall 18.

Differential piston 25 has body 26 which serves to rigidly connect faces 27 and 28. Body 26 has an axial bore 26′, therein within which is mounted rod 17 so that the piston is reciprocal on the rod. When upper face 27 is flush against wall 18, the peripheral edges of bottom face 28 slideably contact cylindrical walls 29 defining liquid-containable chamber 13. Conduit 24 connects the fluid source with chamber 13 permitting fluid at said certain pressure level to fill the chamber. However, face 28 prevents fluid in chamber 13 from entering chamber 12, and gas in chamber 12 from entering chamber 13.

Piston 25 is releasably held in the position shown in FIGURE 1 by a pair of locking balls 30 that are only radially movable in recesses in rod 17 which has an axial bore 31. Plunger 32 is slideably mounted in bore 31, and has mid-portion 33 of a reduced diameter. One end 34 of plunger 32 is enlarged and is slideably mounted in bore 35 in rod 17 adjacent cover 15. The shoulder formed at the intersection of bore 31 with bore 35 forms a stop for the upward movement of plunger 32.

When plunger 32 is in the position shown in FIGURE 1, it holds balls 30 in recess 36 in the bore 26' of body 26. Thus, piston 25 is held so that face 28 serves to disconnect chamber 12 from chamber 13 and face 27 serves to connect chamber 13 to recess 21. Plunger 32 is slideable from its position in FIGURE 1 to its position in FIGURE 2 when propellent gases are produced by electrical actuation of cartridge device 37 screwed into cover 15 and connected to bore 35. Such gases drive plunger 32 upwardly until end 34 abuts the shoulder formed at the intersection of bores 31 and 35. At this position, portion 33 of plunger 32 is radially opposite balls 30 permitting the latter to be unseated from groove 36 of piston 25 by the action of spring 38, one end of which bears against annular shoulder 39 in chamber 13, and the other end of which bears against face 28. Spring 38 biases piston 25 downwardly from the position in FIGURE 1 until the peripheral edge of face 28 is free of surface 29, and the peripheral edge of face 27 is in slideable contact with cylindrical walls 39 below conduit 24. In this position, piston 25 serves to disconnect recess 21 from chamber 13, and to connect the latter to chamber 12. Fluid previously in chamber 13 flows, by gravity, into chamber 12 which contains a quantity of substance 40 that substantially fills chamber 12 and reacts chemically with the fluid to produce a gas.

Substance 40, which may be lithium hydride when the fluid is water, substantially fills chamber 12 prior to actuation of cartridge 37. After actuation of the cartridge and entry of fluid into chamber 12, the gases exit from chamber 12 through exit conduit 41 into pipe 42 through check valve 43.

Valve 43 is of the type which permits gas to flow in one direction only, so that flow through the valve occurs only when the pressure in chamber 12 exceeds the exit pressure of the valve. Where such exit pressure is the same as or greater than the fluid pressure, it is apparent that fluid cannot force its way into the reaction chamber.

Recalling that substance 40 substantially fills chamber 12, it will be appreciated that generator 11 can be made extremely compact because the present invention does not require the housing to be large enough to hold in one filling all of the fluid necessary to react all of the substance. The manner in which the present invention operates will now be described.

Figure 2:
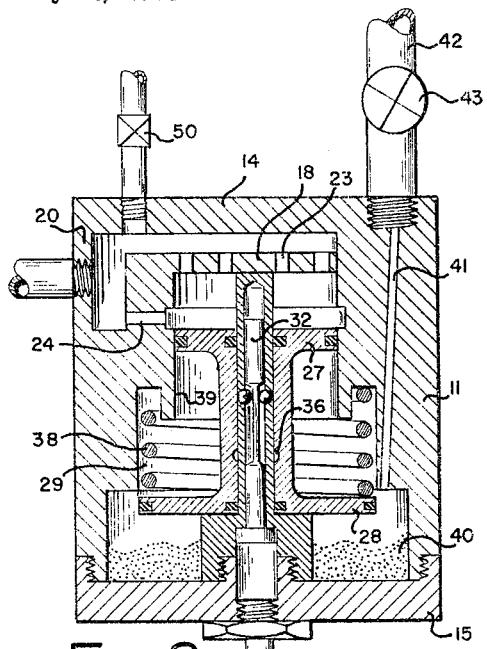
FIGURE 2 shows the valve position at the start of gas generation just after the valve is unlocked.
Figure 3:
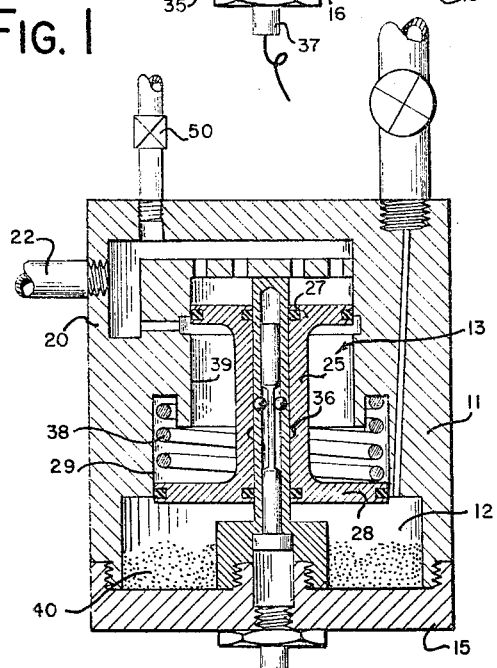
FIGURE 3 shows the valve position after the start of gas generation.

Prior to gas generation, the various movable parts of the generator occupy the relative positions shown in FIGURE 1. When the user desires gas to be generated, he causes cartridge device 37 to be electrically actuated. The propellent gases produced thrust plunger 32 upwardly to the position shown in FIGURE 2 thereby releasing locking balls 30. Obviously, expedients other than a cartridge-actuated device could be used to release piston 25. Spring 38 causes piston 25 to move downwardly to one terminal position at which face 27 disconnects chamber 13 from source 24 and face 28 effects the flow of fluid in chamber 13 into chamber 12. Chemical reactions occur, generating gas whose pressure increases until it exceeds the setting of check valve 43 whereupon gas flows from chamber 12 through exit conduit 41 into pipe 42. The gas also flows into chamber 13 where it is trapped by the engagement of the periphery of face 27 with wall 39. As the reaction in chamber 12 continues, the pressure on the underside of face 27 increases until the total upward force acting on piston 25 due to the gas pressure exceeds the total downward force acting on the piston due to the fluid pressure on the upper face 27 and to spring 38. When this occurs, piston 25 moves upwardly to another terminal position at which face 28 now disconnects chamber 13 from chamber 12 and face 27 effects the flow of fluid from recess 21 into chamber 13. The latter position is shown in FIGURE 3.

Apertures 23 vent the fluid trapped between face 27 and wall 18 into recess 19, and the small amount of gas trapped in chamber 13 is vented through conduit 21 and out of the housing through relief vent 50. Now, despite the fact that the fluid pressure is less than the pressure of the gas in reaction chamber 12, fluid again fills chamber 13.

The reaction continues in chamber 12 until all of the fluid therein combines with substance 40. The pressure in chamber 12 decreases until the upward force of the gas on the bottom of face 28 is less than the downward force of the fluid and spring 38 on piston 25, thereby causing the piston to move to its lower terminal position (FIGURE 2). Thus, the previously described events will again occur. The cycle repeats until all of substance 40 is reacted.

That which is claimed is:

1. A gas generator comprising:
a housing having a source liquid inlet opening and spaced therefrom a reaction chamber with a liquid inlet opening, said reaction chamber being adapted to contain a substance that reacts chemically with a liquid to produce a gas,
gas exit means connected with said reaction chamber for egress of gases generated therein,
a differential pressure movable piston slidably mounted in said housing,
said piston having longitudinally spaced faces, and a longitudinally intermediate lateral recess formed in the body of said piston between said faces,
an intermediate liquid transfer chamber formed intermediate said spaced piston faces by said lateral recess and connectible only separately but not simultaneously to said reaction chamber liquid inlet opening and to said source liquid inlet opening,
said intermediate liquid transfer chamber recess in said piston having an effective longitudinal length no longer than the distance between said source liquid inlet opening and said reaction chamber liquid inlet opening at the respective points of said source liquid inlet opening and reaction chamber liquid inlet opening therewith, whereby said intermediate liquid transfer chamber can be in liquid flow connection at any one time with only one of said source liquid inlet opening and said reaction chamber liquid inlet opening,
one of said faces being disposed in continuous gas pressure connected relation to said reaction chamber, and
spring means urging said piston toward said reaction chamber and against the action of gas pressure in said reaction chamber on said one piston face.

2. A gas generator according to claim 1,
said piston lateral recess extending about the entire annular periphery of said piston intermediate said faces.

3. A gas generator according to claim 2,
said one piston face having a larger diameter than the other said face,
said spring means surrounding said piston intermediate said faces and extending between said one face and a longitudinally opposed portion of said housing.

4. A gas generator according to claim 1,
said piston having a longitudinal opening therein,
and piston movement lock means including a lock member slidably movable within said piston longitudinal opening.

5. A gas generator according to claim 4,
said lock means further comprising a fixed shaft disposed within said piston longitudinal opening and having a longitudinal bore therein in which said lock member is directly slidably mounted, and a detent member releasably engageable in locking relation between said shaft and said piston as a function of longitudinal movement of said slidable lock member in said bore.

6. A gas generator according to claim 4,
and means for releasing said piston movement lock means including an explosive charge,
said slidably movable lock member being movably responsive to actuation of said explosive charge to release said piston for normal liquid flow and gas pressure control operation.

References Cited by the Examiner

UNITED STATES PATENTS 228,315  6/1880  Collins _____ 23—282

MORRIS O. WOLK, *Primary Examiner.*

JAMES H. TAYMAN, JR., *Examiner.*